US007526821B2

(12) United States Patent  (10) Patent No.: US 7,526,821 B2
Chen et al.  (45) Date of Patent: May 5, 2009

(54) SYSTEM AND METHOD OF ASSEMBLING A NURSERY DEVICE FOR SUPPORTING A BABY OCCUPANT

(75) Inventors: Shun-Min Chen, Taipei (TW); Zheng-Wen Guo, Taipei (TW); Ze-hua Yi, Taipei (TW)

(73) Assignee: Wonderland Nurserygoods Co., Ltd, Taipei (TW)

( * ) Notice: Subject to any disclaimer, the term of this patent is extended or adjusted under 35 U.S.C. 154(b) by 159 days.

(21) Appl. No.: 11/600,662

(22) Filed: Nov. 16, 2006

(65) Prior Publication Data

US 2008/0115269 A1    May 22, 2008

(51) Int. Cl.
  *A47D 13/06*  (2006.01)
  *A47C 7/00*  (2006.01)
  *B62B 7/08*  (2006.01)
(52) U.S. Cl. .................. 5/98.1; 5/93.1; 297/440.11; 24/702; 280/650
(58) Field of Classification Search ............... 5/93.1, 5/98.1; 297/440.11; 24/702, DIG. 50; 280/650
See application file for complete search history.

(56) References Cited

U.S. PATENT DOCUMENTS 4,757,854 A    7/1988  Rippberger

| 5,974,636 A | 11/1999 | Brown et al. |
| 6,859,957 B1 * | 3/2005 | Chen ........................... 5/93.1 |
| 2005/0035646 A1 | 2/2005 | Everett |
| 2005/0120522 A1 | 6/2005 | Church et al. |

FOREIGN PATENT DOCUMENTS

| EP | 0051735 A1 | 5/1982 |
| GB | 1360375 A1 | 7/1974 |
| GB | 2425053 A1 | 10/2006 |

\* cited by examiner

*Primary Examiner*—Alexander Grosz
(74) *Attorney, Agent, or Firm*—Baker & McKenzie LLP; David I. Roche

(57) ABSTRACT

A fastener system is implemented to assemble a fabric element with a frame structure of a nursery device for supporting a baby occupant. The fastener system includes a first connecting structure joined with the fabric element and configured to complementarily mate with a second connecting structure having a protrusion extending along a support beam of the frame structure. The first connecting structure includes a flat affixing portion joined with an edge of the fabric element, and an engaging catch linked with the affixing portion through a joint portion. The second connecting structure complementarily mates within the engaging catch of the first connecting structure to fasten the fabric element with the support beam.

20 Claims, 4 Drawing Sheets

SYSTEM AND METHOD OF ASSEMBLING A NURSERY DEVICE FOR SUPPORTING A BABY OCCUPANT

FIELD OF THE INVENTION

The present invention generally relates to nursery devices for supporting a baby occupant, and more particularly a fastener system implemented for the assembly of such devices.

DESCRIPTION OF THE RELATED ART

The construction of nursery devices for supporting a baby occupant, such as a baby crib or a baby stroller, conventionally consists of assembling a rigid frame structure with a soft and flexible material which will be in supporting contact with the baby. The frame structure provides the requisite rigidity for supporting the baby weight, while the soft material is designed to provide a resistant, comfortable and harmless contact with the baby.

The appealing look of these nursery devices usually lies in the design of the soft material part as well as the rigid part of the frame structure. For example, the soft material may be a fabric designed with specific colors, ornamental shapes, fabric textures, etc. In turn, the frame structure may be configured with different shapes, such as rounded and smooth shape contours, to exhibit diverse appealing look. As a result of these design variations, modifications are also necessary for the fastener system implemented to attach the soft material with the frame structure.

For example, U.S. Pat. No. 6,859,957 discloses a fastener system which inserts a positioning post mounted along an edge of a fabric inside a tube of the frame structure. The contour of the tube thus is outwardly apparent as its outer surface is substantially uncovered. However, the foregoing prior art requires the insertion of a portion of the fabric element along with the positioning post inside the tube, which may be inconvenient to operate and create damageable wearing at the joint of the positioning post with the fabric element due to frictional contact with the rim of the opening in the tube.

Therefore, there is presently a need for a simpler fastener system that can attach a fabric element with a frame structure of a baby supporting device without the disadvantages of the prior art.

SUMMARY OF THE INVENTION

The present application describes a fastener system implemented in the assembly of a nursery device for supporting a baby occupant.

According to one embodiment, the nursery device includes a frame structure having a plurality of support beams, a fabric element, and a fastener system for securing the fabric element with at least one support beam. The fastener system includes a first connecting structure joined with the fabric element and a second connecting structure having a protrusion extending along one support beam. The first connecting structure includes an affixing portion fixedly joined with an edge of the fabric element and an engaging catch connected with the affixing portion through a joint portion. The second connecting structure is configured to complementarily mate within the engaging catch of the first connection structure.

At least one advantage of the foregoing fastener system is that damageable interaction between the joint portion, linked with the fabric element, and the second connecting structure is effectively prevented as the second connecting structure engages within the first connecting structure.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
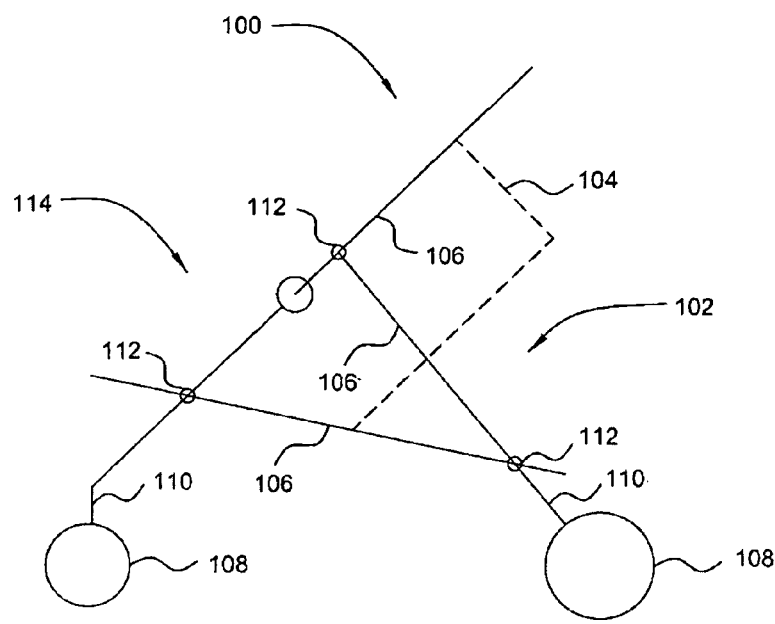
FIG. 1 is a schematic view of a baby stroller which can be implemented with a fastener system according to one embodiment of the invention.

The present application describes a fastener system which can be implemented in the assembly of a nursery device used to support a baby or child occupant. In the drawings, similar reference numerals designate like elements unless otherwise described.

FIG. 1 is a schematic view illustrating the structure of a baby stroller according to an embodiment of the invention. Reference number 100 generally designates a baby stroller, including a frame 102 on which a seat 104 is provided. The frame 102 includes a plurality of tubular beams 106 assembled together to form a structure capable of stably standing and carried on a plurality of wheels 108 mounted to legs 110. According to an embodiment, the beams 106 may be provided with lockable hinges 112 operable for folding the frame 102 for storage of the stroller. The seat 104 may be arranged so as to receive the placement of a baby at the front 114 of the baby stroller 100.

Figure 2:
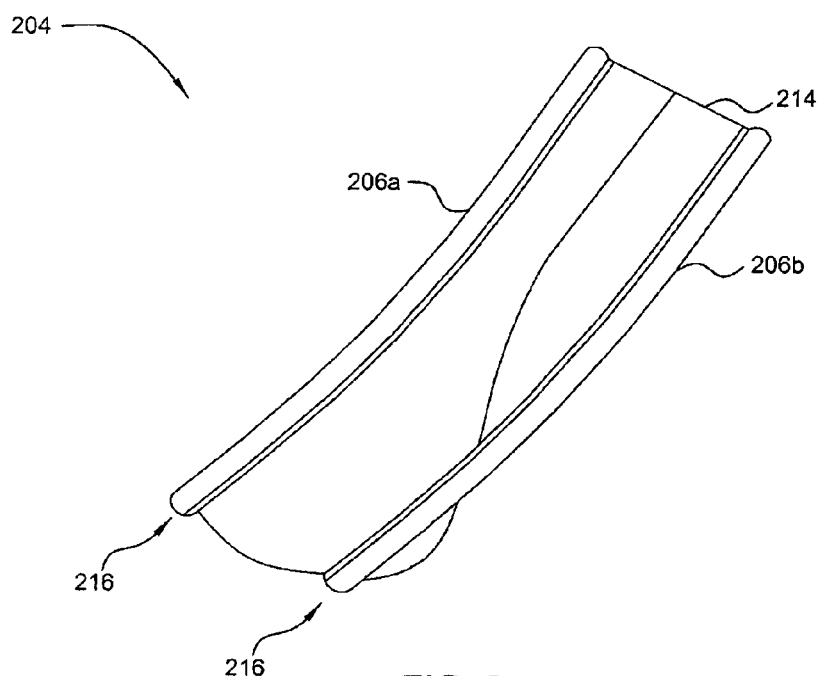
FIG. 2 is a schematic view of a seat assembly of a baby stroller which can be implemented with a fastener system according to one embodiment of the invention.

FIG. 2 is a schematic view particularly showing the configuration of a seat in a baby stroller according to an embodiment of the invention. Reference numbers 206a and 206b refer to two support beams of the baby stroller for supporting a seat 204. The support beams 206a and 206b are mounted parallel each other, and may be configured with any suitable shapes or curved profiles. The support beams 206a and 206b may be made of metal or plastic tubes, or any sufficiently rigid materials. The seat 204 includes a flexible material sufficiently resistant to receive and support the weight of a child or baby such as a seat fabric 214, for example. The seat fabric 214 can be configured with any suitable shapes to provide a comfortable seating. In particular, the seat fabric 214 may incorporate a stiffening material configured to keep the seat shape. In variant embodiments not illustrated, the seat fabric may also be mounted with a child harness system for securely fastening a seated child.

In the illustrated embodiment, the seat fabric 214 is attached to the support beams 206a and 206b along two opposite lengthwise edges 216. The attachment of the seat fabric 214 to the support beams 206a and 206b leaves the support beams 206a and 206b substantially uncovered along the edges 216. As the beams 206a and 206b are outwardly visible, the aesthetic appearance of the baby stroller frame becomes substantially visible.

Figure 3:
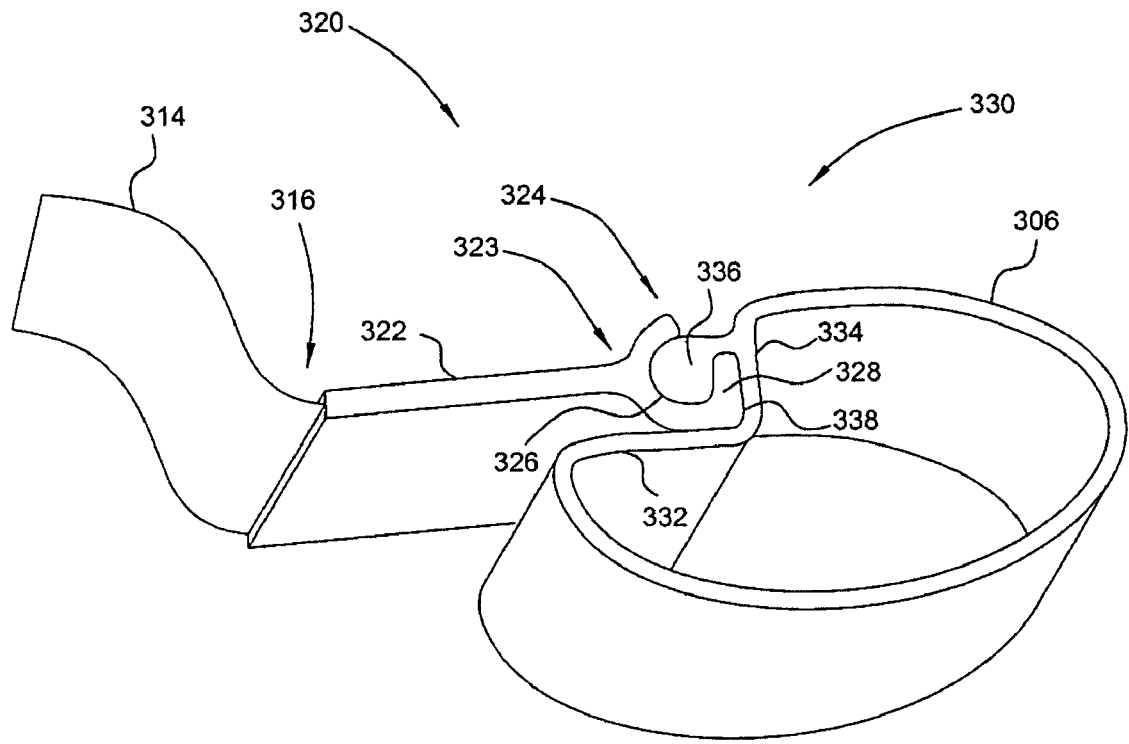
FIG. 3 is a schematic view of a fastener system according to an embodiment of the invention.

FIG. 3 is a schematic view of a fastener system implemented to attach a seat fabric 314 to a support beam 306 of a baby stroller frame according to an embodiment of the invention. An edge portion 316 of the seat fabric 314 is joined with a first connecting structure 320 configured to attach with a second connecting structure 330 provided on the support beam 306. The first connecting structure 320 includes a flat affixing portion 322 connected through a joint portion 323 with an engaging catch 324. The affixing portion 322 provides support for joining with the edge portion 316 of the seat fabric 314, which may be achieved by sewing, adhesion, welding or like methods. The joint portion 323 corresponds to the location where the affixing portion 322 links with the catch 324. The catch 324 is the portion engaging and attaching with the second connecting structure 330. As shown in the illustrated embodiment, the engaging areas of the catch 324 may include a recess 326 and a bent flange 328. The connecting structure 320 including the affixing portion 322, joint portion 323 and engaging catch 324 may be formed as a single body made of molded plastics, for example.

As shown in FIG. 3, the second connecting structure 330 is formed in a recessed portion of the support beam 306 having two contiguous surfaces 332 and 334. A knob 336 protrudes from the surface 334 and includes a narrowed neck portion to form a throat 338 between the knob 336 and the surfaces 332 and 334. The connecting structures 320 and 330 engage each other by a relative sliding operation in a direction substantially parallel to the beam 306, which nests the knob 336 inside the recess 326 of the catch 324 so that the flange 328 is securely gripped in the throat 338. This complementary mating configuration of the connecting structures 320 and 330 blocks any disengagement of the seat fabric 314 transversal to the support beam 306 and leaves the outer surface of the support beam 306 externally exposed. As the second connecting structure 330 substantially nests within the catch 324, the joint portion 323 does not interact with the second connecting structure 330 when the first and second connecting structures 320 and 330 fasten with each other. As a result, undesirable friction wears of the joint portion 323 may be prevented. In addition, as the fastener system is engaged by a simple sliding action along each support beam, the seat fabric 314 can be easily dismounted from the frame structure for repair or cleaning operations.

Figure 4A:
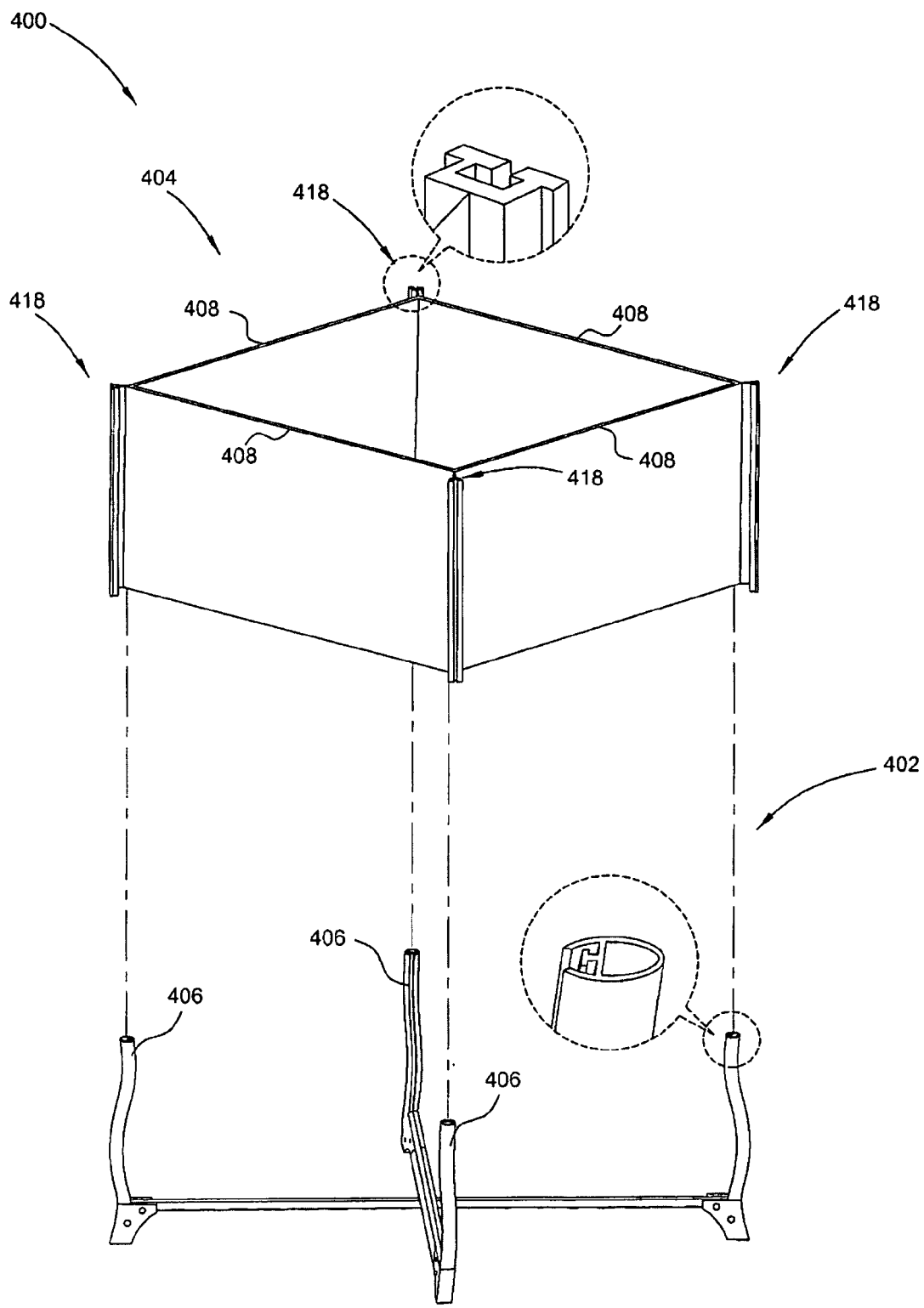
FIG. 4A is a schematic view of a baby crib implementation including a fastener system according to another embodiment of the invention.
Figure 4B:
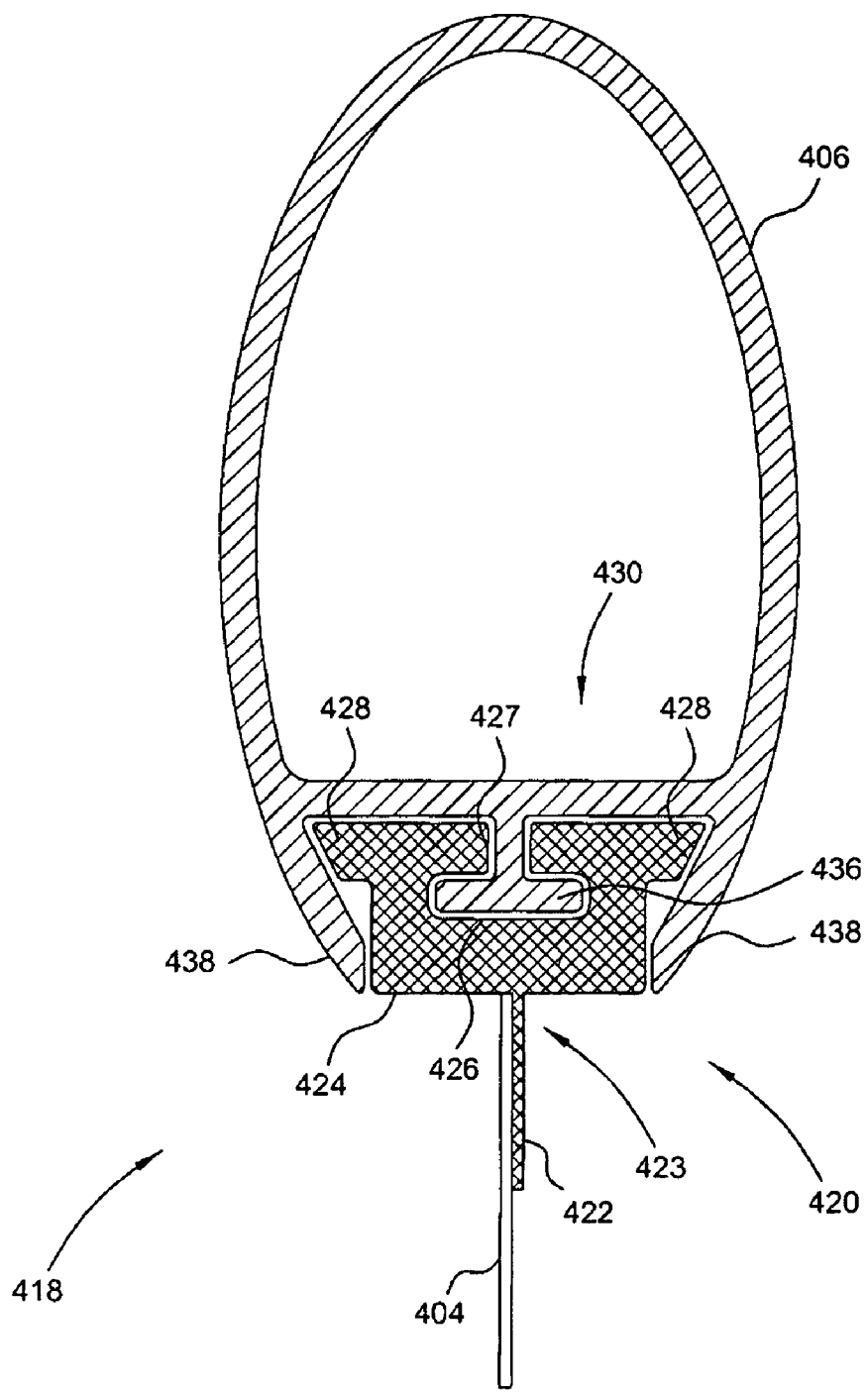
FIG. 4B is a schematic view of a fastener system implemented in a baby crib according another embodiment of the invention.

FIGS. 4A and 4B are schematic views of a variant embodiment of the invention, in which the fastener system may be applicable for the assembly of a baby crib. The baby crib 400 may include a frame structure 402 on which an enclosure member made of a soft and flexible material, such as an enclosure fabric 404, is stretched and assembled. Reference number 406 designates support beams of the frame structure 402 configured to attach with the enclosure fabric 404. As shown, the enclosure fabric 404 includes a plurality of edge portions respectively mounted with one fastener system 418 and joining contiguous side panels 408 of the enclosure fabric 404. The attachment of the enclosure fabric 404 to the support beams 406 leaves the support beams 406 substantially uncovered along the edges portions of the enclosure fabric 404.

FIG. 4B is a schematic view particularly illustrating the fastener system 418. The fastener system 418 includes a first connecting structure 420 joined with an edge portion of the enclosure fabric 404, and a second connecting structure 430 provided on one support beam 406. The first connecting structure 420 includes an affixing part 422 secured with the enclosure fabric 404 by, for example, sewing, adhesion, welding or like methods. The affixing portion 422 connects through a joint portion 423 with a catch 424 configured to fasten with the second connecting structure 430 of the support beam 406. Having an approximately "fork" shape, the catch 424 includes a slot 426 opening through a throat 427 and two flanges 428 extending at two opposite sides of the catch 424. The first connecting structure 420 may be formed in a single body, or made up by the assembly of separate component parts.

As shown in FIG. 4B, the second connecting structure 430 on the support beam 406 includes a T-shaped retainer protrusion 436 configured to fit through the slot 426 by a sliding movement along the beam 406, and bent shoulders 438 configured to overlap the flanges 428 of the catch 424. In the illustrated embodiment, the second connecting structure 430 is exemplary formed with the support beam 406 in a single body. The connecting structures 420 and 430 thereby complementarily mate each other to securely fasten the enclosure fabric 404 with the support beam 406. An advantage of this configuration is that the joint portion 423 does not interact with the second connecting structure 430 as the first and second connecting structures 420 and 430 attach with each other and/or when the joint portion 423 is subject to some degree of deflection relative to the beam 406 in use. As a result, undesirable friction wears may be prevented.

The fastener system according to the invention described herein thus can effectively attach a flexible supporting material with a frame beam and prevent the occurrence of undesirable interactions within the fastener system which may create wears and damage its internal components. In addition, as the fastener system of the invention leaves each support beam substantially uncovered, an appealing design can be applied to the contour and shape of the support beams to enhance the aesthetic appearance of the nursery device.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A nursery device for supporting a baby occupant, comprising:
a frame structure including a plurality of support beams;
a fabric element stretched adjacent to the frame structure; and
a fastener system for securing the fabric element with at least one support beam, wherein the fastener system includes:
a first connecting structure, including an affixing portion fixedly joined with an edge of the fabric element and an engaging catch having a first end connected with the affixing portion; and
a second connecting structure protruding along the support beam and configured to complementarily mate within the engaging catch through a distal second end of the engaging catch.

2. The device according to claim 1, wherein the first connecting structure is formed in a single body.

3. The device according to claim 1, wherein the second connecting structure is formed with the at least one support beam in a single body.

4. The device according to claim 1, wherein the second connecting structure includes at least a protrusion with a narrowed portion for nesting with the engaging catch of the first connecting structure.

5. The device according to claim 1, wherein the engaging catch of the first connecting structure complementarily mates with the second connecting structure by sliding along the second connecting structure.

6. The device according to claim 1, being implemented as a baby stroller.

7. The device according to claim 6, wherein the fabric element includes a seat fabric.

8. The device according to claim 1, being implemented as a baby crib.

9. The device according to claim 8, wherein the fabric element forms an enclosure element.

10. The device according to claim 9, wherein the enclosure element includes a plurality of side panels having joining edges along which the side panels connect with one another.

11. The device according to claim 10, wherein the first connecting structure is provided at each joining edge of the side panels.

12. A fastener system suitable for attaching a fabric element with a frame structure of a nursery device for supporting a baby occupant, the fastener system including a first connecting structure joined with an edge of the fabric element and configured to attach with a second connecting structure along a support beam of the frame structure; wherein
the first connecting structure comprising:
an affixing portion joined with the edge of the fabric element; and
an engaging catch having a first end linked with the affixing portion; and
the second connecting structure protruding along the support beam and configured to complementarily mate within the engaging catch through a distal second end of the engaging catch.

13. The fastener system according to claim 12, wherein the first connecting structure is formed in a single body.

14. The fastener system according to claim 12, wherein the second connecting structure includes a protrusion with a narrowed portion for nesting with the engaging catch of the first connecting structure.

15. The fastener system according to claim 12, wherein the engaging catch of the first connecting structure complementarily mates with the second connecting structure by sliding along the second connecting structure.

16. The fastener system according to claim 12, wherein the affixing portion is joined with the edge of the fabric element by methods including sewing, adhesion, welding or the like.

17. The fastener system according to claim 12, wherein the engaging catch is interposed between the second connecting structure and a joint portion connecting the affixing portion with the first end of the engaging catch, when the second connecting structure is complementarily mated within the engaging catch.

18. A method of assembling a nursery device for supporting a baby occupant, comprising:
providing a fabric element having one edge joined with a first connecting structure, wherein the first connecting structure includes:
an affixing portion joined with the edge of the fabric element; and
an engaging catch having a first end linked with the affixing portion;
providing a frame structure including at least one support beam having a protruding second connecting structure; and
attaching the first connecting structure with the second connecting structure by complementarily mating the second connecting structure within the engaging catch through a distal second end of the engaging catch.

19. The method according to claim 18, wherein attaching the first connecting structure with the second connecting structure includes sliding the first connecting structure along the second connecting structure.

20. The method according to claim 18, wherein providing a fabric element having one edge joined with a first connecting structure includes joining the affixing portion with the edge of the fabric element by methods including sewing, adhesion, welding or the like.

* * * * *